(12) United States Patent
Hsieh

(10) Patent No.: US 7,164,840 B2
(45) Date of Patent: Jan. 16, 2007

(54) DUST CAP FOR FIBER OPTIC COMPONENTS

(75) Inventor: John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 129 days.

(21) Appl. No.: 10/835,201

(22) Filed: Apr. 29, 2004

(65) Prior Publication Data

US 2005/0220434 A1   Oct. 6, 2005

Related U.S. Application Data

(60) Provisional application No. 60/557,643, filed on Mar. 30, 2004.

(51) Int. Cl.
*G02B 6/00* (2006.01)
(52) U.S. Cl. ........................................ 385/134; 385/139
(58) Field of Classification Search ...................... None
See application file for complete search history.

(56) References Cited

U.S. PATENT DOCUMENTS

| 4,640,575 | A | 2/1987 | Dumas | 350/96 |
| 5,414,790 | A * | 5/1995 | Lee et al. | 385/139 |
| 5,506,922 | A | 4/1996 | Grois et al. | 385/75 |
| 5,943,462 | A * | 8/1999 | Schofield et al. | 385/100 |
| 6,041,155 | A | 3/2000 | Anderson et al. | 385/139 |
| 6,188,825 | B1 | 2/2001 | Bandy et al. | 385/134 |
| 6,471,416 | B1 * | 10/2002 | Lu | 385/60 |
| 6,547,450 | B1 * | 4/2003 | Lampert | 385/78 |
| 6,550,979 | B1 * | 4/2003 | Fleenor et al. | 385/78 |

\* cited by examiner

*Primary Examiner*—Sung Pak
*Assistant Examiner*—Omar Rojas
(74) *Attorney, Agent, or Firm*—Workman Nydegger

(57) ABSTRACT

The present invention extends to a dust cap for protecting optical components from end face contamination due to external debris and that reduces the potential of the dust cap itself causing end face contamination. In one embodiment, a dust cap includes an elongate housing with a peripheral shell, an open proximal end, and a closed distal end having a predetermined size and shape for covering an optical component end face. The dust cap also includes a protective portion defining a protective cavity of a predetermined depth and position configured so as to protect the optical component end face without contacting the optical component end face. The dust cap also includes an attachment portion for attaching the dust cap to the optical component configured to reduce the potential of contaminating the optical component when the dust cap is attached to and/or removed from the optical component.

12 Claims, 3 Drawing Sheets

DUST CAP FOR FIBER OPTIC COMPONENTS

CROSS REFERENCE TO RELATED APPLICATIONS

This application claims priority to U.S. Provisional Patent Application Ser. No. 60/557,643, filed on Mar. 30, 2004, entitled "Dust Cap For Fiber Optic Components", the contents of which are incorporated herein in its entirety.

BACKGROUND OF THE INVENTION

1. The Field of the Invention

The present invention generally relates to preventing contamination of fiber optical components. More particularly, the invention relates to dust cap covers for fiber optic components.

2. Related Technology

Because of their high bandwidth and reliable high-speed data transmissions, fiber optic networks are increasingly becoming a popular mode of communication. These high-speed communication networks utilize optical-electronic components such as optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by a transceiver and transmitted in a fiber optical cable via the optical network, such as a local area network (LAN) backbone, for instance.

The optical signal is then received by a reception node of the network. Once received by the reception node, the optical signal is fed to another optical transceiver for conversion via a photo-detector into electrical signals. The electrical signals are then forwarded to a host, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

Connections between an optical transceiver and corresponding optical network can include a number of intermediate components, such as, for example, patch cables and optical hubs. Thus, efficient communication over an optical network depends, at least in part, on the quality and reliability of these intermediate components. Accordingly, damage to or contamination of any of these intermediate components can reduce throughput or otherwise adversely affect communications. For example, contaminated components in an optical communication path can degrade return loss, reduce link budget, increase bit errors, and cause other problems in an optical link. If damage or contamination is significant, communication over an optical network may not be possible.

Accordingly, preventing the contamination of optical components is of increased importance to entities that utilize optical networks for data communication. In response to the increased importance, specifications directed to the cleanliness of optical components are currently being developed by industry standards bodies. Subsequent to development of these industry standards and as a result of the general demand for more efficient and reliable optical components, many entities will demand optical components that meet these new industry standards.

To reduce potential contamination, many vendors use existing dust caps or end covers (hereinafter refereed to collectively as "dust caps") to protect the end face of optical components. Existing dust caps can prevent external dust and other debris from collecting on and thereby contaminating an optical component end face. Thus, existing dust caps may promote more efficient and reliable communication over optical networks. However, while providing protection from external contamination, the design of many existing dust caps can cause the dust caps themselves to contaminate optical component end faces Several design features of existing dust caps can potentially cause this undesirable contamination. A first problematic design feature of existing dust caps are that the inner surface of existing dust caps contact, or bottom out, against the end face when inserted. Another problematic design feature of existing dust caps are that the opening in existing dust caps is too small, and an edge of the dust caps' opening may contact an optical component end face during it's insertion. Thus, as a result of many existing dust cap designs, any prior contamination of the dust cap (e.g., dust or debris) can be transferred to an optical component end face when the dust cap positioned to protect an optical component interface.

Another problem with some existing dust cap designs is caused when the dust cap is held against the shaft of the ferrule of an optical component. This design feature causes the dust cap to rub and slide against the ferrule shaft, which potentially transfers contaminants from the ferrule shaft to a corresponding optical component end face. Resulting contamination of an optical component may later make it difficult to connect one optical component to another (e.g., connecting an optical patch cable to an optical transceiver). This problem is often termed a "hard-plug" problem.

Contamination of fiber optic components caused by these undesirable features of the existing dust cap designs increase costs involved with cleaning, scrapping, trouble shooting, and handling customer returns of contaminated optical components. Accordingly, what would be advantageous are improved dust caps that are design to reduce contamination at optical component end faces.

BRIEF SUMMARY OF THE INVENTION

The foregoing problems with the prior state of the art are overcome by the principles of the present invention, which are directed to a dust cap for protecting optical components from end face contamination due to external debris and that reduces the potential of the dust cap itself causing end face contamination. In one embodiment, a dust cap includes an elongate housing with a peripheral shell, an open proximal end, and a closed distal end having a predetermined size and shape for covering an optical component end face. The dust cap also includes a protective portion defining a protective cavity of a predetermined depth and position. The protective portion is configured so as to protect the optical component end face without contacting the optical component end face. The dust cap also includes an attachment portion for attaching the dust cap to the optical component. The attachment portion is configured to reduce the potential of contaminating the optical component when the dust cap is attached to and/or removed from the optical component.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
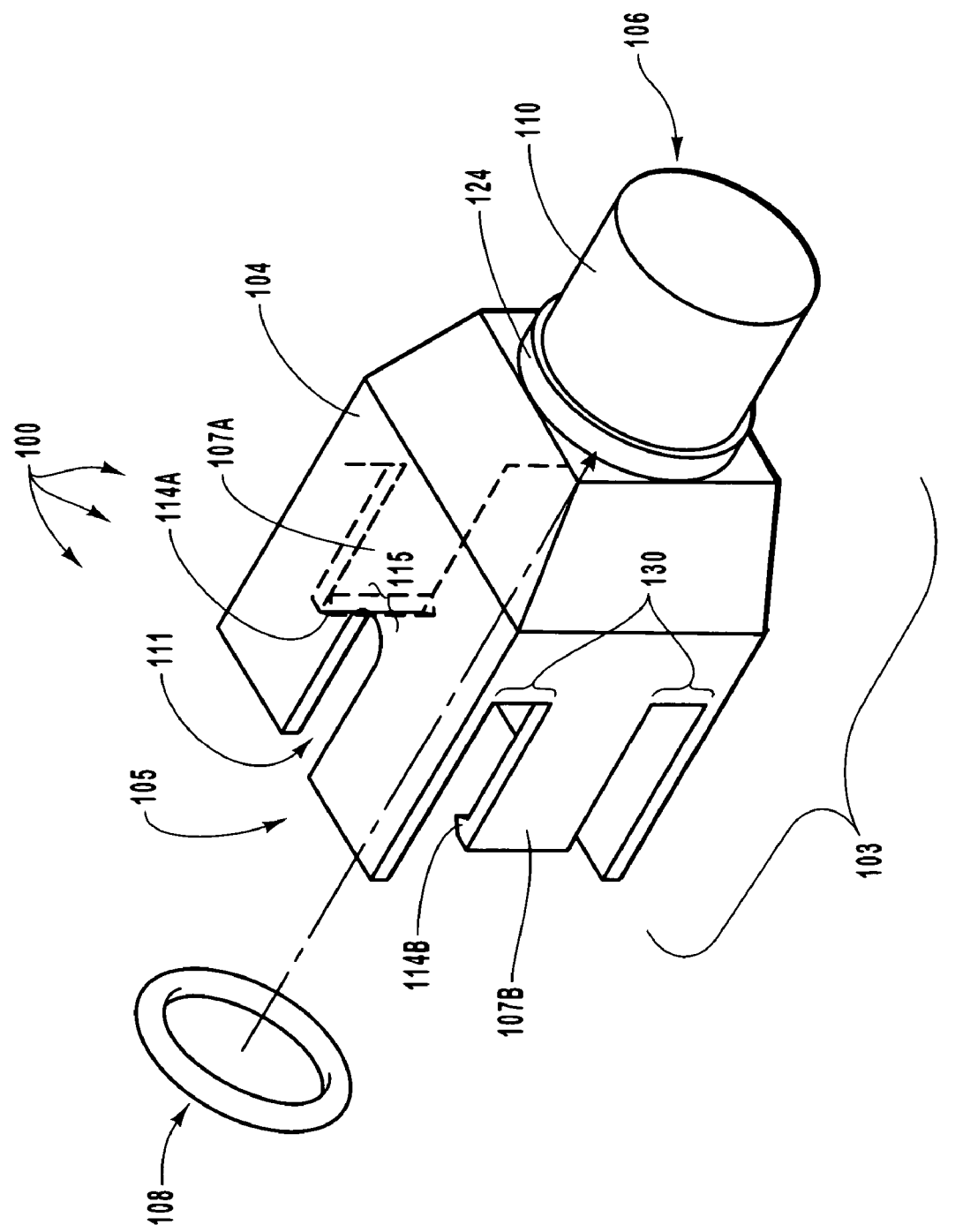
FIG. 1 illustrates example dust cap in accordance with the principles of the present invention.
Figure 2:
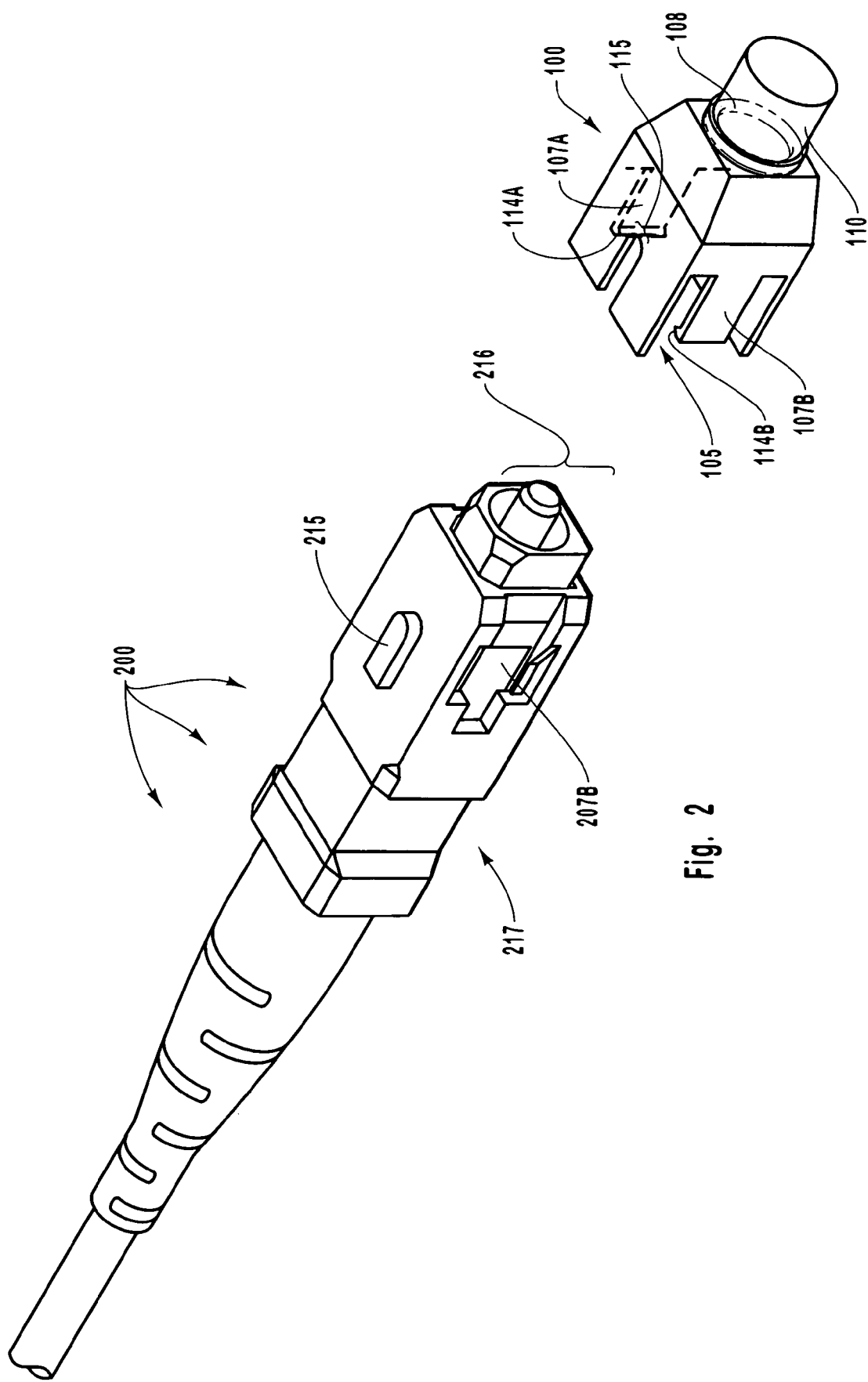
FIG. 2 illustrates an example dust cap along with an end portion of an optical cable.
Figure 3:
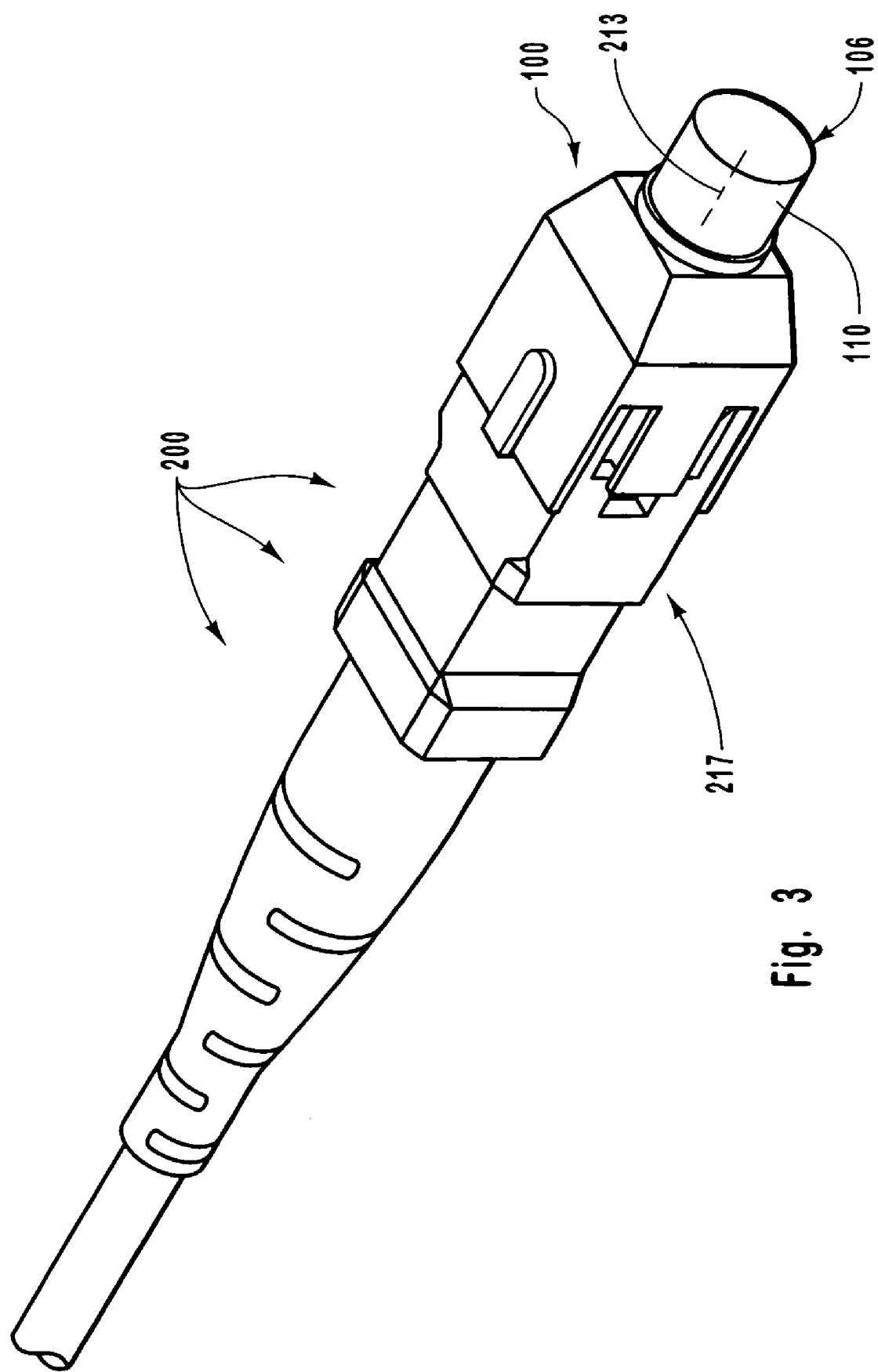
FIG. 3 illustrates an example of the example dust cap attached to the end portion of the optical cable.

The principles of the present invention relate to a dust cap for protecting optical components from end face contamination due to external debris and that reduces the potential of the dust cap itself causing end face contamination. FIGS. 1, 2, and 3, which form part of this disclosure, provide example embodiments of the present invention. This invention may, however, be embodied in many different forms and should not be construed as limited to the example embodiments set forth herein.

FIG. 1 illustrates a dust cap 100 in accordance with the principles of the present invention. The dust cap 100 can be used to protect the end face of an optical component from contamination. The dust cap 100 can include an elongate housing of predetermined size and shape for covering the end portion of a corresponding optical component. For example, elongate housing 103 is a substantially rectangular shape corresponding to the outer shape of the end of an SC terminated cable and is sized so as to cover the end of the SC terminated cable. However, the shape and size of dust cap 100 can also be configured so as to be received at the end of other optical components, such as, for example, LC, ST, and FC terminated cables. The elongate housing 103 may be made from an anti-static light-gauge sheet-metal, polymer, or other appropriate substance. Materials that prevent outgassing effects and/or that are easy to clean can be particularly advantageous for making elongate housing 103.

The dust cap 100 also includes a protective portion 110 that defines a protective cavity of a predetermined depth and position (i.e., the interior of protective portion 110) so as to protect an optical component end face from damage and debris. Distal end 106 covers the end of protective portion 110. Through appropriate configuration, the protective portion 110 can protect the optical component end face without contacting the optical component end face.

The dust cap 100 also includes an attachment portion for attaching the dust cap 100 to a corresponding optical component. Latching arms included in the attachment portion can facilitate the attachment of dust cap 100 to the outer portion of a corresponding optical component. For example, latching arms can facilitate the attachment of dust cap 100 to a corresponding optical component in a snap-fit manner. The dust cap 100 can include any number of latching arms. For example, as depicted in FIG. 1, dust cap 100 includes two latching arms 107A and 107B located on opposing sides of dust cap 100. Latching arms 107A and 107B include corresponding catches 114A and 114B that can engage with an optical component to secure dust cap 100 to the optical component.

The latching arms 107A and 107B facilitate the attachment of dust cap 100 to an optical component at a predetermined position. Dust cap 100 may be removed from an optical component by pulling on the outer shell of the optical component, while securing the top and bottom surfaces of peripheral shell 104. Manipulating in this manner can cause catches 114A and 114B to disengage (release) dust cap 100 from an optical component. Openings 130 facilitate flexible movement of a corresponding latching arm (e.g., latching arm 107B) such that the corresponding latching arm can be more easily manipulated to attach dust cap 100 to or release dust cap 100 from an optical component.

As depicted in FIG. 1, dust cap 100 includes two opposing latching arms, latching arms 107A and 107B. However, the number and arrangement of attachment portions is not limited to the number and arrangement of latching arms depicted in FIG. 1. It would be apparent to one skilled in the art, after having reviewed this description, that embodiments of the present invention can include a varied number and arrangement of attachment portions, in addition to those depicted in FIG. 1. Further, it would be apparent to one skilled in the art, after having reviewed this description, that embodiments of the present invention can include a variety of different attachment portions, in addition to latching arms.

Dust cap 100 can further include an O-ring 108 that is inserted into elongate house 103 along the dotted arrow and, when inserted, resides in O-ring cavity 124. O-ring 108 can be inserted into elongated housing 103 at a predetermined position to provide a (e.g., water-tight and/or air-tight) seal when dust cap 100 is attached to the end of a corresponding optical component. It would be apparent to one skilled in the art, after having reviewed this description, that O-ring 108 may be made from a compliant polymer or other appropriate substance.

According to the example dust cap embodiment depicted in FIG. 1, the open proximal end 105 may have dimensions greater than a portion of a corresponding optical component that dust cap 100 is to protect. For example, the dimensions of open proximal end 105 may have dimensions greater than the end of an SC terminated cable. When open proximal end 105 has greater dimensions, undesirable contact between dust cap 100 and a corresponding optical component is (possibly significantly) reduced. For example, when utilized to protect an end of an SC terminated cable, dust cap 100 may have reduced contact with the fiber end face and shaft of the SC terminated cable.

In addition, opening 111 provides a keying feature 115 that facilities proper alignment and insertion of dust cap 100 onto the end of an optical component via a corresponding keying feature on the optical component. Although FIG. 1 depicts a single keying feature (keying feature 115) other numbers and arrangements of keying features may be utilized.

FIG. 2 illustrates dust cap 100 along with an end portion 217 of an SC terminated cable 200. As depicted in FIG. 2, the size and configuration of dust cap 100 is such that dust cap 100 can be received over optical end face 216. Dust cap 100 is depicted with O-ring 108 inserted into O-ring cavity 124. Accordingly, when secured to end portion 217, dust cap 100 provides a seal that protects optical end face 216 while reducing contact between dust cap 100 and optical end face 216.

Keying feature 215 can interoperate with keying feature 115 providing keying and aligning features described above and preventing improper insertion of dust cap 100 onto end portion 217. Latching arms 107A and 107B engage corresponding attachment portions on end portion 217 to secure dust cap 100 to end portion 217. For example, catch 114B can engage to latching receptacle 207B to secure dust cap 100 to end portion 217. Catch 114A can also engage to a latching receptacle on the back side of end portion 217 (not shown) to secure dust cap 100 to end portion 217. Since the dimensions of open proximal end 105 can be greater than the profile of end portion 217, undesirable contact between dust cap 100 and end portion 217, including optical end face 216, is (possibly significantly) reduced when attaching dust cap 100 to end portion 217. At least one of the latching arms 107A and 107B can have a first unflexed position when the catches 114A and 114B are engaged with the latching receptacles on the end portion 217, and a second flexed position when the catches 114A and 114B are biased against the end portion 217 but the catches 114A and 114B are not engaged with the receptacles.

FIG. 3 illustrates dust cap 100 attached to end portion 217. With dust cap 100 attached, protective portion 110 defines a protective cavity of a predetermined depth and configuration (e.g., cylindrical) so as to protect optical end face 216 (covered by dust cap 100) while having reduced (and potentially no) contact with optical end face 216. The predetermined depth provides for a clearance distance 213 between optical end face 216 and closed distal end 106. Thus, when clearance distance 213 is great enough, the closed distal end 106 does not come into contact with the optical end face 216 after attachment of dust cap 100. Accordingly, the transfer of contaminants from the dust cap 100 to optical end face 116 is (possibly significantly) reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope

What is claimed is:

1. A dust cap for protecting an optical component end face of an optical component from contaminants, comprising:
   an elongate housing comprising a peripheral shell, an open proximal end, and a closed distal end, the closed distal end having a predetermined size and shape for covering an end portion of the optical component;
   a protective portion defining a protective cavity of a predetermined depth and shape, the protective portion configured so as to protect the optical component end face while having reduced contact with the optical component end face; and
   a flexible attachment portion configured to secure the dust cap to the end portion of the optical component, wherein the attachment portion comprises at least one flexible attaching arm, the at least one flexible attaching arm has a catch on an end of the attaching arm that can engage a corresponding receptacle on the optical component, and the at least one flexible attaching arm has a first unflexed position when the catch is engaged with the receptacle on the optical component, and a second flexed position when the catch is biased against the optical component but the catch is not engaged with the receptacle.

2. The dust cap as recited in claim 1, further comprising:
   at least one alignment feature for aligning and positioning the dust cap onto the optical component when the dust cap is attached to the optical component.

3. The dust cap as recited in claim 2, wherein the at least one alignment feature comprises a keying feature that interoperates with a corresponding keying feature of the optical component so as to facilitate proper attachment of the dust cap to the end portion of the optical component.

4. The dust cap as recited in claim 1, further comprising:
   a sealing component positioned within the dust cap for contacting a surface of the optical component so as to provide a seal around the end face of the optical component.

5. The dust cap as recited in claim 4, wherein the sealing component comprises an O-ring that provides at least one of an air-tight and a water-tight seal around the end face of the optical component.

6. The dust cap as recited in claim 1, wherein the attachment portion is configured to be attached to the end portion of the optical component, the optical component selected from among an SC, LC, ST and FC terminated cable.

7. The dust cap as recited in claim 1, wherein the elongate housing is of a pre-determined size and shape for covering the end portion of the optical component, the optical component selected from among an SC, LC, ST and FC terminated cable.

8. The dust cap as recited in claim 1, wherein the protective portion defines a protective cavity for protecting the end face of the optical component, the optical component selected from among an SC, LC, ST or FC terminated cable.

9. A dust cap, comprising:
   a peripheral shell including at least one flexible latching arm configured to releasably engage an end of an optical component;
   a protective portion attached to the peripheral shell, the protective portion cooperating with the peripheral shell to define a cavity that is open at one end and substantially closed at another end, the protective portion being configured such that when the at least one flexible latching arm is engaged with the optical component, the protective portion and at least a portion of an end face of the optical component are positioned in a non-contact arrangement relative to each other; and
   an O-ring positioned in an O-ring cavity located within the protective portion of the dust cap, the O-ring being configured to provide a seal about the end of the optical component when the dust cap is attached to the end of the optical component by the at least one flexible latching arm such that contaminants are substantially prevented from entering the protective portion of the dust cap when the dust cap is engaged with the end of the optical component.

10. The dust cap as recited in claim 9, wherein the protective portion and at least a portion of an end face of one of the following optical components are positioned in a non-contact arrangement relative to each other:
    an SC terminated cable;
    an LC terminated cable;
    an ST terminated cable; and
    an FC terminated cable.

11. The dust cap as recited in claim 9, wherein the at least one flexible latching arm comprises a pair of flexible latching arms.

12. The dust cap as recited in claim 9, wherein the dust cap is configured to cooperate with corresponding structure of the optical component in such a way that insertion of the optical component into the dust cap is substantially prevented if the dust cap and the corresponding structure of the optical component are not positioned in a predetermined orientation relative to each other.

* * * * *